(12) United States Patent
Ferrari et al.

(10) Patent No.: US 11,216,981 B2
(45) Date of Patent: Jan. 4, 2022

(54) SYSTEM AND METHOD FOR CALIBRATING IMAGE DATA DURING AN AGRICULTURAL OPERATION USING A COLOR INDICATOR

(71) Applicant: CNH Industrial America LLC, New Holland, PA (US)

(72) Inventors: Luca Ferrari, Modena (IT); Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 97 days.

(21) Appl. No.: 16/522,862

(22) Filed: Jul. 26, 2019

(65) Prior Publication Data
US 2021/0027498 A1    Jan. 28, 2021

(51) Int. Cl.
| | |
|---|---|
| *G06T 7/00* | (2017.01) |
| *G06T 7/90* | (2017.01) |
| *H04N 5/235* | (2006.01) |

(52) U.S. Cl.
CPC ............ *G06T 7/90* (2017.01); *H04N 5/2351* (2013.01); *H04N 5/2353* (2013.01); *H04N 5/2354* (2013.01)

(58) Field of Classification Search
CPC ...... G06T 7/90; H04N 5/2353; H04N 5/2354; H04N 5/2351; H04N 5/23212; A01B 63/002; A01B 79/02; G06K 9/2027
See application file for complete search history.

(56) References Cited

U.S. PATENT DOCUMENTS

| | | | |
|---|---|---|---|
| 5,187,754 A | 2/1993 | Currin et al. | |
| 5,473,375 A | 12/1995 | Takayama et al. | |
| 6,459,495 B1 | 10/2002 | Silverbrook | |
| 6,665,454 B1 | 12/2003 | Silverbrook et al. | |

(Continued)

FOREIGN PATENT DOCUMENTS

| | | |
|---|---|---|
| WO | WO2002080771 | 10/2002 |
| WO | WO2018122242 | 7/2018 |

OTHER PUBLICATIONS

PCT International Search Report and Written Opinion issued in corresponding Application No. PCT/US2020/042977 dated Oct. 29, 2020 (12 pages).

(Continued)

*Primary Examiner* — Ping Y Hsieh
*Assistant Examiner* — Xiao Liu
(74) *Attorney, Agent, or Firm* — Rebecca L. Henkel; Rickard K. DeMille (57) ABSTRACT

In one aspect, a system for calibrating image data during the performance of an agricultural operation may include an imaging device configured to capture image data associated with a portion of a field within a field of view of the imaging device. Additionally, the system may include a color indicator positioned within the field of view of the imaging device. Moreover, the system may include a controller configured to receive the image data from the imaging device and determine an apparent color value of the color indicator based on the received image data. Furthermore, the controller may be configured to adjust at least one of an operating parameter of the imaging device or a variable associated with processing the received image data based on the determined apparent color value.

18 Claims, 4 Drawing Sheets

(56) References Cited

U.S. PATENT DOCUMENTS

| | | |
|---|---|---|
| 7,423,821 B2 | 9/2008 | Bechtel et al. |
| 8,064,691 B2 | 11/2011 | Meyer et al. |
| 8,368,954 B2 | 2/2013 | Yoshida |
| 8,917,317 B1 | 12/2014 | Beeler |
| 8,971,622 B2 | 3/2015 | Kano |
| 9,087,274 B2 | 7/2015 | Kawabata et al. |
| 9,270,959 B2 | 2/2016 | Shu et al. |
| 9,659,237 B2 | 5/2017 | Puetter et al. |
| 9,699,447 B2 | 7/2017 | Bajema et al. |
| 10,055,850 B2 | 8/2018 | Piekniewski et al. |
| 2002/0113881 A1* | 8/2002 | Funston .............. H04N 5/23293 348/223.1 |
| 2014/0180549 A1 | 6/2014 | Siemens et al. |
| 2016/0275682 A1 | 9/2016 | Natroshvili |
| 2017/0112043 A1* | 4/2017 | Nair .................. A01B 17/002 |
| 2017/0229059 A1* | 8/2017 | Bonnier .................. G06F 3/017 |
| 2017/0303466 A1 | 10/2017 | Grufman et al. |
| 2018/0027222 A1 | 1/2018 | Ogasawara et al. |
| 2019/0244022 A1 | 8/2019 | Hundley et al. |
| 2019/0392239 A1* | 12/2019 | Ferrari ................... A01B 79/02 |

OTHER PUBLICATIONS

Kostić, Marko, M., et al., "Application of an Original Soil Tillage Resistance Sensor in Spatial Prediction of Selected Soil Properties," Computers and Electronics in Agriculture, vol. 127, Jul. 23, 2016, pp. 615-624.

Rathnayaka, Pathum, et al., "Calibration of a Different Field-of-View Stereo Camera System Using an Embedded Checkerboard Pattern," SCITEPRESS—Science and Technology Publications, Lda., 2017, pp. 294-300.

Wang, Qi, "Autonomous Machine Vision for Off-Road Vehicles in Unstructured Fields," University of Illinois at Urbana-Champaign, 2009, 104 pages.

Ymeti, Irena, et al., "Using Color, Texture and Object-Based Image Analysis of Multi-Temporal Camera Data to Monitor Soil Aggregate Breakdown," Sensors, vol. 17, Issue 6, May 30, 2017, 21 pages.

* cited by examiner

SYSTEM AND METHOD FOR CALIBRATING IMAGE DATA DURING AN AGRICULTURAL OPERATION USING A COLOR INDICATOR

FIELD OF THE INVENTION

The present disclosure generally relates to agricultural machines and, more particularly, to systems and methods for calibrating image data captured during the performance of an agricultural operation by an agricultural machine.

BACKGROUND OF THE INVENTION

Agricultural implements, such as cultivators, disc harrows, seeders, and/or the like, perform one or more agricultural operations while being towed across a field by a suitable work vehicle, such as in agricultural tractor. In this regard, agricultural implements often include one or more sensors mounted thereon to monitor various parameters associated with the performance of such agricultural operations. For example, some agricultural implements include one or more cameras or other imaging devices that capture image data of the soil and/or plants within the field. Thereafter, such image data may be processed or analyzed to determine one or more parameters associated with the condition of soil and/or plants, such as parameters related to soil roughness, plant health, weed growth, and/or the like.

The accuracy of the soil/plant parameters(s) determined based on the captured image data is affected by the ambient lighting conditions within the field. For example, the color of plants and/or soil depicted within image data may appear different when the imaging device capturing such data is in direct sunlight than when the imaging device is shaded. As such, in certain instances, variations in the ambient lighting conditions across the field may cause the determined value(s) of the soil/plant parameter(s) to change even though the actual value(s) of such parameter(s) has not changed.

Accordingly, an improved system and method for calibrating image data during the performance of an agricultural operation would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for calibrating image data during the performance of an agricultural operation. The system may include an agricultural machine configured to perform an agricultural operation on a field across which the agricultural machine is traveling. Furthermore, the system may include an imaging device provided in operative association with the agricultural machine, with the imaging device configured to capture image data associated with a portion of the field within a field of view of the imaging device. Additionally, the system may include a color indicator provided in association with the agricultural machine such that the color indicator is positioned within the field of view of the imaging device. Moreover, the system may include a controller communicatively coupled to the imaging device. As such, the controller may be configured to receive the image data from the imaging device. In addition, the controller may be configured to determine an apparent color value of the color indicator based on the received image data. Furthermore, the controller may be configured to adjust at least one of an operating parameter of the imaging device or a variable associated with processing the received image data based on the determined apparent color value.

In another aspect, the present subject matter is directed to a method for calibrating image data during the performance of an agricultural operation by an agricultural machine. The agricultural machine may include an imaging device configured to capture image data associated with a portion of a field within a field of view of the imaging device and a color indicator positioned within the field of view of the imaging device. The method may include receiving, with one or more computing devices, image data from the imaging device as the agricultural operation is being performed. Furthermore, the method may include determining, with the one or more computing devices, an apparent color value of the color indicator based on the received image data. Additionally, the method may include adjusting, with the one or more computing devices, at least one of an operating parameter of the imaging device or a variable associated with processing the received image data based on the determined apparent color value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In general, the present subject matter is directed to systems and methods for calibrating image data during the performance of an agricultural operation. Specifically, in several embodiments, the system may include an imaging device (e.g., a camera) provided in operative association with an agricultural machine performing the agricultural operation. The imaging device may, in turn, be configured to capture image data associated with a portion of the field within a field of view of the imaging device. Furthermore, the system may include a color indicator positioned within the field of view of the imaging device. For example, in one embodiment, the color indicator may correspond to a geometric shape (e.g., a dot) having a predetermined color value (e.g., an RGB value associated with a "white" color). In such an embodiment, the geometric shape may, for example, be positioned on (e.g., painted on or otherwise adhered to) a portion of a frame member of the agricultural machine within the field of view of the imaging device.

In accordance with aspects of the present subject matter, a controller of the disclosed system may be configured to calibrate the captured image data based on the apparent color value of the color indicator. Specifically, the apparent color value of the color indicator may vary from its predetermined color value in certain lighting conditions (e.g., when the field of view of the imaging device is in direct sunlight or shaded). As such, the controller of the disclosed system may be configured to receive the captured image data from the imaging device during the performance of the agricultural operation. Moreover, the controller may be configured to determine the apparent color value of the color indicator based on the received image data. Thereafter, the controller may be configured to adjust one or more operating parameters (e.g., the exposure time, the white-balance setting, the brightness setting, the saturation setting, the contrast setting, and/or the activation of a flash or supplemental lighting device) of the imaging device and/or one or more variables associated with processing the received image data (e.g., the range of hues associated with a selected color) based on the apparent color value of the color indicator. Such adjustments may, in turn, calibrate the captured image data as a function of the lighting conditions of the field of view of the imaging device. The calibrated image data may then be used to determine one or more parameters associated with the portion of the field present within the field of view of the imaging device, such as parameters related to soil roughness, plant health, weed growth, and/or the like.

Figure 1:
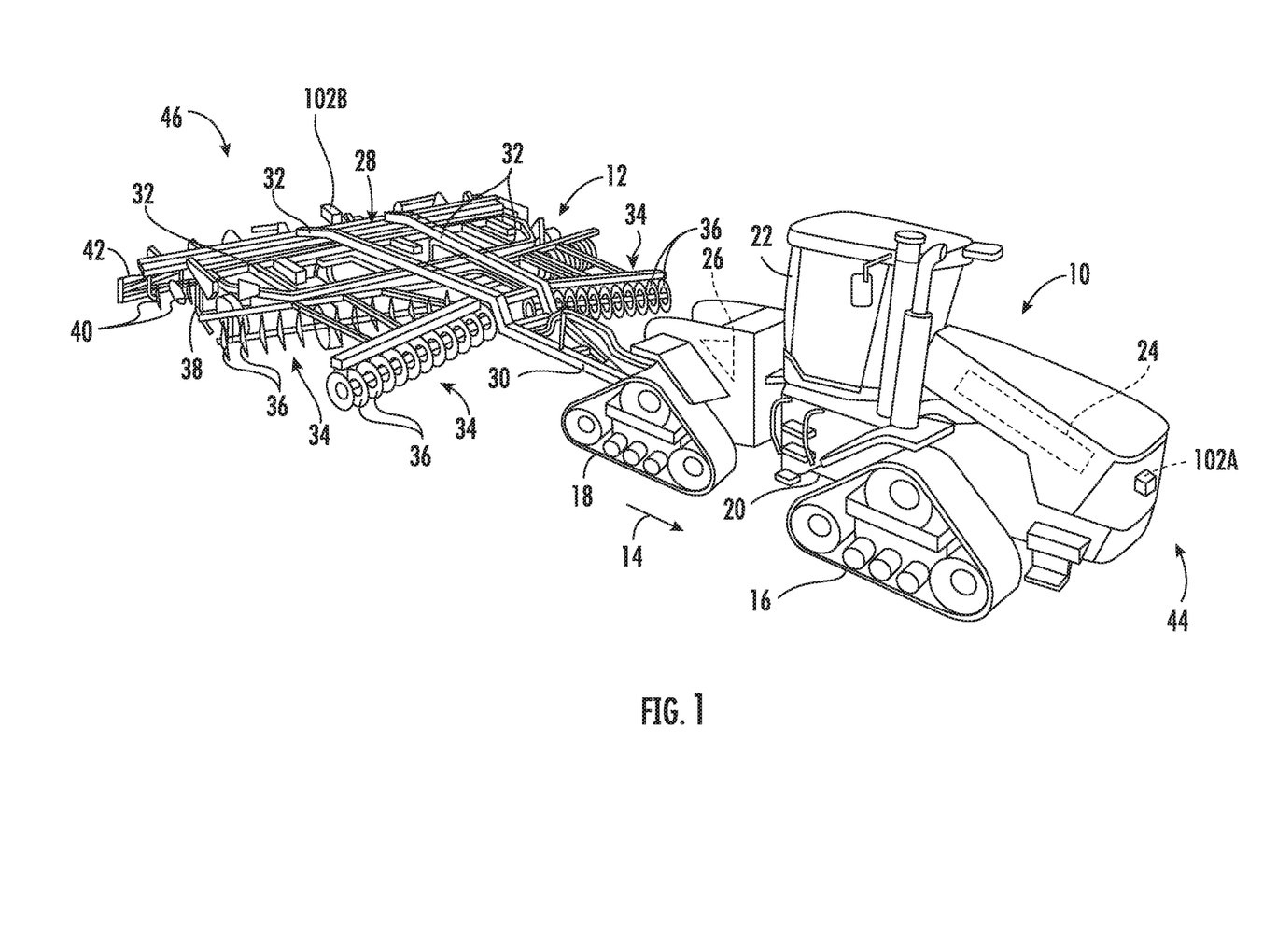
FIG. 1 illustrates a perspective view of one embodiment of an agricultural machine in accordance with aspects of the present subject matter.

Referring now to the drawings, FIG. 1 illustrates a perspective view of one embodiment of an agricultural machine in accordance with aspects of the present subject matter. As shown, in the illustrated embodiment, the agricultural machine corresponds to a work vehicle 10 and an associated agricultural implement 12. In general, the work vehicle 10 may be configured to tow the implement 12 across a field in a direction of travel (e.g., as indicated by arrow 14 in FIG. 1). As such, in one embodiment, the work vehicle 10 may be configured as an agricultural tractor and the implement 12 may be configured as a tillage implement. However, in other embodiments, the work vehicle 10 may be configured as any other suitable type of vehicle, such as an agricultural harvester, a self-propelled sprayer, and/or the like. Similarly, the implement 12 may be configured as any other suitable type of implement, such as a planter. Furthermore, it should be appreciated that the agricultural machine may correspond to any suitable powered and/or unpowered agricultural machine (including suitable vehicles and/or equipment, such as only a work vehicle or only an implement). Additionally, the agricultural machine may include more than two machines (e.g., a tractor, a planter, and an associated air cart) coupled to a work vehicle.

As shown in FIG. 1, the work vehicle 10 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 10 and/or one or more components of the implement 12. Additionally, the work vehicle 10 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, as shown in FIG. 1, the implement 12 may generally include a frame 28 configured to be towed by the vehicle 10 via a pull hitch or tow bar 30 in the direction of travel 14. In general, the frame 28 may include a plurality of structural frame members 32, such as beams, bars, and/or the like, configured to support or couple to a plurality of components. As such, the frame 28 may be configured to support a plurality of ground-engaging tools, such as a plurality of shanks, disk blades, leveling blades, basket assemblies, tines, spikes, and/or the like. In one embodiment, the various ground-engaging tools may be configured to perform a tillage operation or any other suitable ground-engaging operation on the field across which the implement 12 is being towed. For example, in the illustrated embodiment, the frame 28 is configured to support various gangs 34 of disc blades 36, a plurality of ground-engaging shanks 38, a plurality of leveling blades 40, and a plurality of crumbler wheels or basket assemblies 42. However, in alternative embodiments, the frame 28 may be configured to support any other suitable ground-engaging tool(s) or combinations of ground-engaging tools.

Furthermore, the vehicle/implement 10/12 may include one or more imaging devices coupled thereto and/or mounted thereon. As will be described below, each imaging device may be configured to capture image data (e.g., images) associated with a portion of the field across which the vehicle/implement 10/12 is traveling. The captured image data may, in turn, be indicative of one or more parameters or characteristics of the field. For example, such parameters/characteristics may include surface roughness, clod size, residue coverage, weed presence/coverage, and/or the like. As such, in several embodiments, the imaging device(s) may be provided in operative association with the vehicle/implement 10/12 such that the device(s) has an associated field(s) of view or sensor detection range(s) directed towards a portion(s) of the field adjacent to the vehicle/implement 10/12. For example, as shown in FIG. 1, in one embodiment, one imaging device 102A may be mounted on a forward end 44 of the work vehicle 10 to capture image data associated with a section of the field disposed in front of the vehicle 10 relative to the direction of travel 14. Similarly, as shown in FIG. 1, a second imaging device 102B may be mounted on an aft end 46 of the implement 12 to capture image data associated with a section of the field disposed behind the implement 12 relative to the direction of travel 14. However, in alternative embodiments, the imaging devices 102A, 102B may be installed at any other suitable location(s) on the vehicle/implement 10/12. Additionally, in some embodiments, the vehicle/implement 10/12 may include only one imaging or three or more imaging devices.

Figure 2:
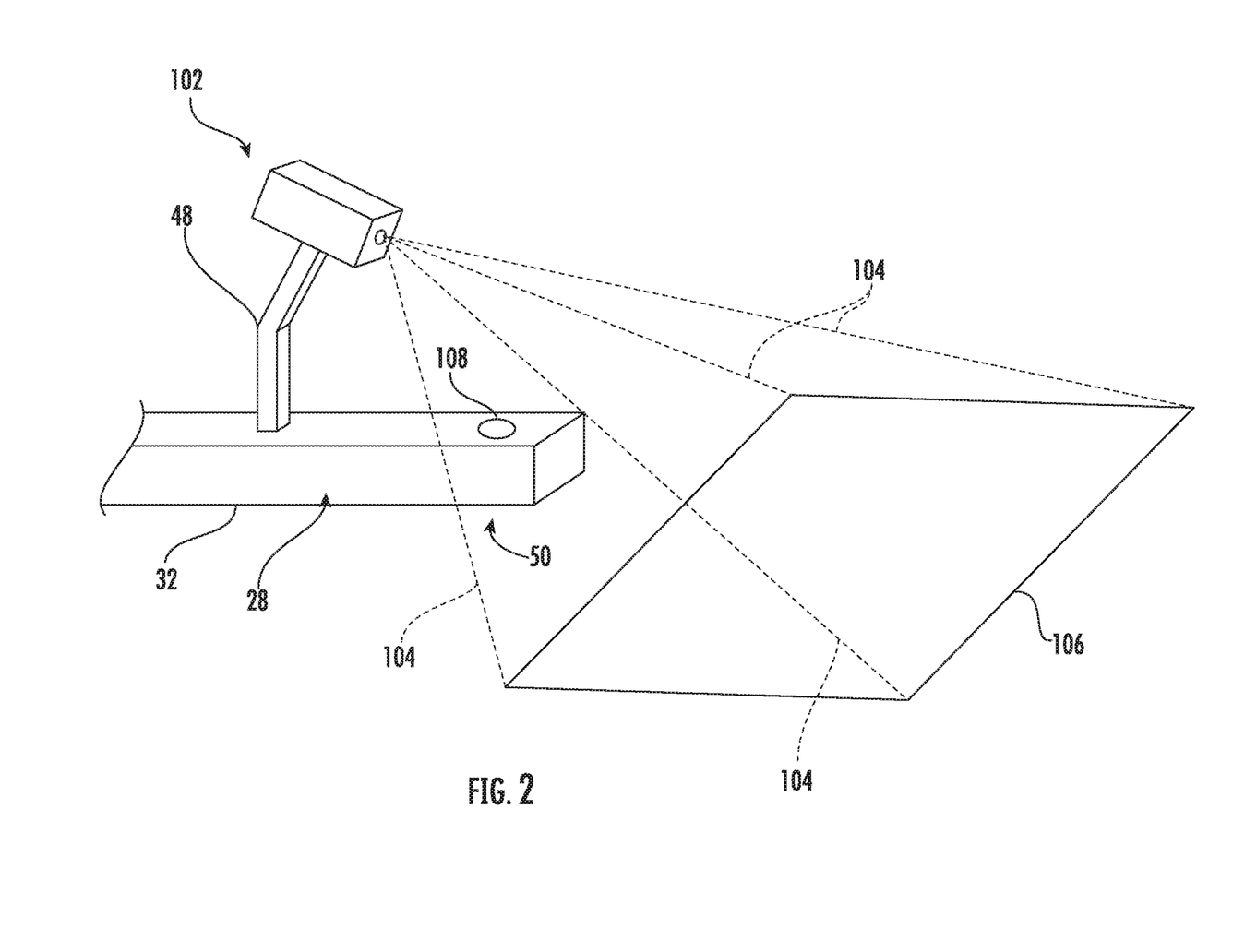
FIG. 2 illustrates a perspective view of one embodiment of an imaging device of an agricultural machine in accordance with aspects of the present subject matter, particularly illustrating a color indicator of the agricultural machine positioned within a field of view of the imaging device.

Referring now to FIG. 2, a perspective view of one embodiment of an imaging device 102 of the vehicle/implement 10/12 is illustrated in accordance with aspects of the present subject matter. Specifically, in several embodiments, the imaging device 102 may be coupled to or mounted on the implement frame 28 such that the imaging device 102 has a field of view (e.g., as indicated by dashed lines 104 in FIG. 2) directed at a portion 106 of the field across which the vehicle/implement 10/12 is traveling. For example, in one embodiment, a mounting arm 48 may be configured to couple the imaging device 102 to one of the frame members 32 of the implement 12. Furthermore, as shown, in several embodiments, a portion 50 of one of the frame members 32 of the implement 10 may positioned within the field of view 104 of the imaging device 102. However, in alternative embodiments, the imaging device 102 may be coupled to or mounted on the vehicle/implement 10/12 in any other suitable manner.

It should be appreciated that the imaging device 102 may correspond to any suitable sensing device(s) configured to detect or capture image data associated with the plants and/or soil present within its field of view 104. For example, in several embodiments, the imaging device 102 may correspond to a suitable camera(s) configured to capture three-dimensional images of the soil surface or the plants present within the portion 106 of the field within its field of view 104. For instance, in a particular embodiment, the imaging device 102 may correspond to a stereographic camera(s) having two or more lenses with a separate image sensor for each lens to allow the camera(s) to capture stereographic or three-dimensional images. However, in alternative embodiments, the imaging device 102 may correspond to any other suitable sensing device(s) configured to capture image data, such as a monocular camera.

In accordance with aspects of the present subject matter, a color indicator 108 may be provided in operative association with the vehicle/implement 10/12. As will be described below, the color indicator 108 may be used to calibrate the captured image data. Specifically, in several embodiments, the color indicator 108 may be positioned on the vehicle/implement 10/12 such that the color indicator 108 is located within the field of view 104 of the imaging device 102. For example, as shown, in one embodiment, the color indicator 108 may be positioned on the portion 50 of the frame member 32 located within the field of view 104 of the imaging device 102. As such, the image data captured by the imaging device 102 may depict or otherwise be indicative of the color indicator 108 in addition to the characteristic(s) of the portion 106 of the field that are also present within its field of view 104. However, in alternative embodiments, color indicator 108 may be positioned on and/or coupled to any other suitable component of the vehicle 10 and/or the implement 12 such that the color indicator is located within the field of view 104 of the imaging device 102.

In several embodiments, the color indicator 108 may have a predetermined color value associated therewith. In general, the apparent color value of the color indicator 108 may vary based on the lighting conditions of the field of view 104 of the imaging device 102. As used herein, the "apparent color value" of an object may be the color value that the object appears when depicted by captured image data. For example, the captured image data may depict the color indicator 108 as having a lighter color value when the field of view 104 is in direct sunlight as opposed to when the field of view 104 is shaded. In this regard, the predetermined color value associated with the color indicator 108 may be associated with the apparent color value of the color indicator 108 when the field of view 104 of the imaging device 102 is experiencing specific lighting conditions (e.g., a specific brightness or light intensity). As will be described below, the apparent color value of the color indicator 108 may generally be indicative of the lighting conditions of the field of view 104 of the imaging device 102. Specifically, when the apparent color value of the color indicator 108 differs from its predetermined color value, the lighting conditions of the field of view 104 of the imaging device 102 may differ from the lighting conditions associated with the predetermined color value. In such instances, a controller may be configured to calibrate the captured image data, such as by adjusting one or more operating parameters of the imaging device 102 and/or one or more variables associated with processing the captured image data. Additionally, in one embodiment, the predetermined color value may correspond to an RGB value. However, in alternative embodiments, the predetermined color value may correspond to any other suitable color value.

It should be appreciated that the color indicator 108 may correspond to any suitable component or visual indicator configured to provide an indication of the lighting conditions of the field of view 104 of the imaging device 102. For example, in one embodiment, the color indicator 108 may correspond to a white dot or circle painted on the portion 50 of the frame member 32 positioned within the field of view 104 of the imaging device 102. However, in alternative embodiments, the color indicator 108 may have any other suitable shape (e.g., a square, triangle, and/or the like) and/or combination of shapes (e.g., a pattern or series of individual shapes). Furthermore, in one embodiment, the color indicator 108 may be a component that is coupled to the vehicle/implement 10/12, such as a disc-like component. In addition, the color indicator 108 may have any other suitable color.

Moreover, it should be appreciated that the vehicle/implement 10/12 may include any suitable number of color indicators 108. For example, in one embodiment, the vehicle/implement 10/12 may include a color indicator 108 positioned within the field of view 104 of each imaging device 102 coupled thereto and/or mounted thereon. For example, each of the imaging devices 102A, 102B shown in FIG. 1 may include a color indicator 108 positioned within its field of view. In another embodiment, the vehicle/implement 10/12 may include a color indicator 108 positioned within only some of the fields of view 104 of the imaging devices 102 coupled thereto and/or mounted thereon. Additionally, in a further embodiment, the vehicle/implement 10/12 may include a single color indicator 108 positioned within the field of view 104 of one of the imaging devices 102 coupled thereto and/or mounted thereon. Furthermore, in one embodiment, the vehicle/implement 10/12 may include multiple color indicators 108 positioned within the field of view 104 of each imaging device 102 coupled thereto and/or mounted thereon.

Additionally, it should be further appreciated that the configuration of the work vehicle 10 and agricultural implement 12 described above and shown in FIGS. 1 and 2 is provided only to place the present subject matter in an exemplary field of use. Thus, it should be appreciated that the present subject matter may be readily adaptable to any manner of agricultural machine configuration.

Figure 3:
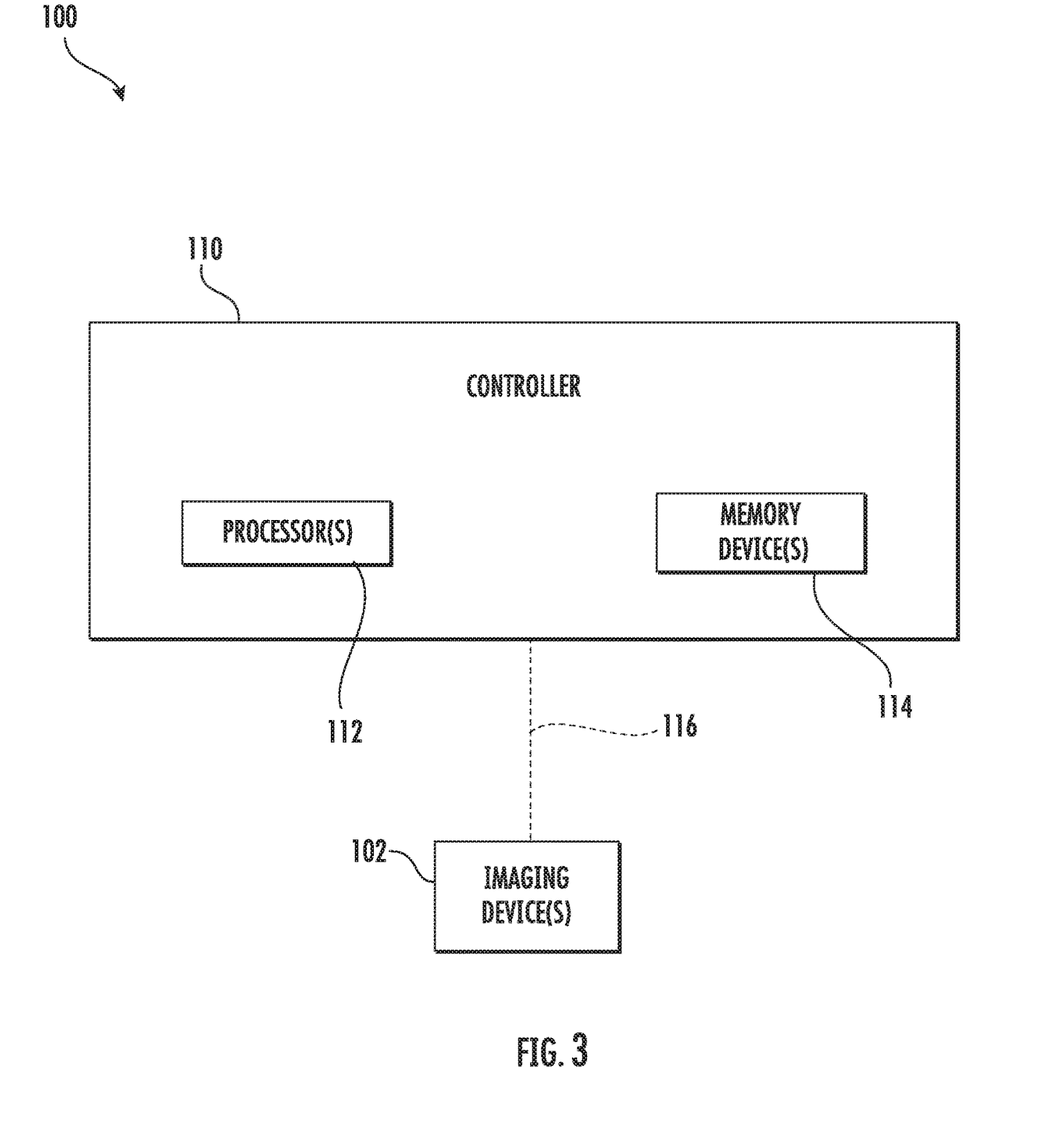
FIG. 3 illustrates a schematic view of one embodiment of a system for calibrating image data during the performance of an agricultural operation in accordance with aspects of the present subject matter.

Referring now to FIG. 3, a schematic view of one embodiment of a system 100 for calibrating image data during the performance of an agricultural operation is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with agricultural machines having any other suitable machine configuration.

As shown in FIG. 3, the system 100 may include a controller 110 positioned on and/or within or otherwise associated with the vehicle 10 and/or the implement 12. In general, the controller 110 may comprise any suitable processor-based device known in the art, such as a computing device or any suitable combination of computing devices. Thus, in several embodiments, the controller 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the controller 110 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 114 may generally be configured to store suitable computer-readable instructions that, when implemented by the processor(s) 112, configure the controller 110 to perform various computer-implemented functions.

In addition, the controller 110 may also include various other suitable components, such as a communications circuit or module, a network interface, one or more input/output channels, a data/control bus and/or the like, to allow controller 110 to be communicatively coupled to any of the various other system components described herein (e.g., the imaging device(s) 102). For instance, as shown in FIG. 3, a communicative link or interface 116 (e.g., a data bus) may be provided between the controller 110 and the imaging device(s) 102 to allow the controller 110 to communicate with such imaging device(s) 102 via any suitable communications protocol (e.g., CANBUS).

It should be appreciated that the controller 110 may correspond to an existing controller(s) of the vehicle 10 and/or the implement 12, itself, or the controller 110 may correspond to a separate processing device. For instance, in one embodiment, the controller 110 may form all or part of a separate plug-in module that may be installed in association with the vehicle 10 and/or the implement 12 to allow for the disclosed systems to be implemented without requiring additional software to be uploaded onto existing control devices of the vehicle 10 and/or the implement 12. It should also be appreciated that the functions of the controller 110 may be performed by a single processor-based device or may be distributed across any number of processor-based devices, in which instance such devices may be considered to form part of the controller 110. For instance, the functions of the controller 110 may be distributed across multiple application-specific controllers, such as an engine controller, a transmission controller, an implement controller, and/or the like.

In several embodiments, the controller 110 may be configured to receive image data from one or more imaging devices 102. As described above, the vehicle/implement 10/12 may include one or more imaging devices 102 (e.g., a camera(s)), with each imaging device 102 configured to capture image data of a portion of the field within its field of view 104. In this regard, as the vehicle/implement 10/12 travels across the field to perform an agricultural operation thereon (e.g., a tillage operation), the controller 110 may be configured to receive the image data from the imaging device(s) 102 (e.g., via the communicative link 116). As will be described below, the controller 110 may be configured to calibrate the captured image data based on the lighting conditions/characteristics of the field(s) of view 104 of the imaging device(s) 102 such that the image data provides an accurate indication of one or more parameters or characteristics associated with the field.

Furthermore, the controller 110 may be configured to determine an apparent color value(s) of the color indicator(s) 108 based on the received image data. As indicated above, the vehicle/implement 10/12 may include one or more color indicators 108 associated therewith, with each color indicator 108 being positioned within the field of view 104 of one of the imaging devices 102. In this regard, the received image data may depict the apparent color(s) of the color indicator(s) 108 under the current lighting conditions (e.g., light intensity or brightness) of the field(s) of view 104 of the imaging device(s) 102. As such, in several embodiments, the controller 110 may be configured to analyze/process the received image data to determine the apparent color(s) of the color indicator(s) 108. For example, the controller 110 may include a suitable algorithm(s) stored within its memory device(s) 114 that, when executed by the processor(s) 112, identify or determine the apparent color(s) of the color indicator(s) 108 based on the received image data. It should be appreciated that the determined apparent color value(s) may correspond to any suitable color value(s), such as an RGB value(s).

In accordance with aspects of the present subject matter, the controller 110 may be configured to calibrate the image data captured by the imaging device(s) 102 based on the determined apparent color(s) of the color indicator(s) 108. More specifically, the lighting conditions of the field(s) of view 104 of the imaging device(s) 102 may affect the quality of the image data captured by such device(s) 102 and the accuracy of any field characteristic/parameter determinations made based on such image data. Moreover, as indicated above, the apparent color(s) of the color indicator(s) 108 may generally be indicative of the lighting conditions of the field(s) of view 104 of the imaging device(s) 102. For example, the apparent color(s) of the color indicator(s) 108 may be darker when the field(s) of view 104 of the imaging device(s) 102 is shaded as opposed to when the field(s) of view 104 is in direct sunlight. In this regard, the controller 110 may be configured to adjust one or more operating parameters (e.g., the exposure time, the white-balance setting, the brightness setting, the saturation setting, the contrast setting, the activation of a flash/supplemental lighting device(s), and/or the like) of the imaging device(s) 102 and/or one or more variables associated with processing the received image data (e.g., the range of hue values associated with a selected color) based on the determined apparent color value(s). For instance, when the determined apparent color value(s) of the color indicator(s) 108 differs from the predetermined color value value(s) associated with such color indicator(s) 108, the controller 110 may be configured to adjust the operating parameter(s) and/or the variable(s). Such adjustments may, in turn, compensate for current lighting conditions/characteristics of the field(s) of view 104 of the imaging device(s) 102 such that accurate determinations of the field characteristics/parameters can be made based on the captured image data.

In several embodiments, the controller 110 may be configured to adjust the operating parameter(s) of the imaging device(s) 102 and/or the variable(s) associated with processing the received image data when the determined apparent color value(s) of the color indicator(s) 108 falls outside of a predetermined apparent color value range. In general, a particular set of operating parameters of the imaging device(s) 102 and/or the variables associated with processing the received image data may be suitable when the field(s) of view 104 of such imaging device(s) 102 experiences a particular range of lighting conditions. Furthermore, the color indicator(s) 108 may have a particular range of apparent color value(s) when the field(s) of view 104 of the imaging device(s) 102 is experiencing this range of lighting conditions. As such, the controller 110 may be configured to compare the determined apparent color value(s) to a predetermined apparent color value range associated with the current operating parameter(s) of the imaging device(s) 102 and/or the variable(s) associated with processing the received image data. Thereafter, when the determined apparent color value(s) falls outside of the predetermined apparent color value range (thereby indicating that the current operating parameter(s) of the imaging device(s) 102 and/or the variable(s) associated with processing the received image data are not suitable for the current lighting conditions), the controller 110 may be configured to adjust the operating parameter(s) and/or variable(s).

Additionally, the controller 110 may be configured to adjust the operating parameter(s) of the imaging device(s) 102 and/or the variable(s) associated with processing the received image data based a determined apparent color value differential between a plurality of color indicators 108. As indicated above, in several embodiments, the vehicle/implement 10/12 may include a plurality of imaging devices 102 and associated of color indicators 108, with each color indicator 108 being positioned within the field of view 104 of one of the imaging devices 102. Moreover, the imaging devices 102 may be spaced apart from each other the vehicle/implement 10/12. For example, in one embodiment, one imaging device 102 may be positioned on one lateral side of the vehicle/implement 10/12, while another imaging device 102 may be positioned on an opposite lateral side of the vehicle/implement 10/12. As such, the field of view 104 of each imaging device 102 may experience different lighting conditions/characteristics. For instance, the field of view 104 of one of the imaging devices 102 may be shaded, while the field of view of 104 of another imaging device 102 may be in direct sunlight. In such instances, the apparent color value of the shaded color indicator 108 may be darker than the apparent color value of the color indicator 108 experiencing direct sunlight. In this regard, the controller 110 may be configured to compare the determined apparent color values of the plurality of color indicators 108 to determine an apparent color value differential therebetween. Thereafter, when the apparent color value differential exceeds a first predetermined differential threshold (thereby indicating that the lighting conditions of the fields of view 104 of the corresponding imaging devices 102 differ), the controller 110 may be configured to adjust the operating parameter(s) and/or the variable(s).

In one embodiment, the controller 110 may be configured to compare the determined apparent color value differential to a second predetermined differential threshold. In general, the second predetermined differential threshold may correspond to a greater apparent color value differential than the first apparent color value differential. More specifically, as indicated above, the determined apparent color values of a plurality of color indicators 108 may differ when differing lighting conditions exist within the corresponding fields of view 104. However, there may generally be a maximum apparent color value differential that can be expected to exist between the color indicators 108 based on the possible lighting conditions of the corresponding fields of view 104. For example, when one field of view 104 is shaded and another field of view 104 is in direct sunlight, there is a maximum light intensity differential that may exist between such fields of view 104. As such, when the determined apparent color differential exceeds the maximum apparent color value differential, it may be assumed that one of the color indicators 108 has become dirty or soiled. In this regard, the controller 110 may be configured to compare the determined apparent color value differential to the second predetermined differential threshold. Thereafter, when the apparent color value differential exceeds the second predetermined differential threshold (thereby indicating that one of the color indicators 108 has become dirty or soiled), the controller 110 may be configured to provide a notification to the operator of the vehicle/implement 10/12 (e.g., by causing a visual or audible notification or indicator to be presented to the operator) indicating that the color indicators 108 should be cleaned.

As indicated above, the controller 110 may be configured to adjust one or more operating parameters of the imaging device(s) 102 based on the determined apparent color value(s) of the color indicator(s) 108. Such operating parameters may include the exposure time, brightness setting, white-balance setting, contrast setting, saturation setting, sharpness setting, the saturation setting, the contrast setting, the activation of a flash/supplemental lighting device, and/or the like. For example, when the apparent color value(s) is darker than the predetermined color value(s) of the color indicator(s) 108 (thereby indicating a low light condition within the field(s) of view 104 of the corresponding imaging device(s) 102), the controller 110 may be configured to increase the exposure time to increase the amount of light received by the image sensor(s) (not shown) of the imaging device(s) 102. Furthermore, in such instances, the controller 110 may be configured to activate a flash(es) or a supplemental lighting device(s) (e.g., an LED(s)) of the imaging device(s) 102 to increase the amount of light present within the associated field(s) of view 106. Conversely, when the apparent color value(s) is lighter than the predetermined color value(s) of the color indicator(s) 108 (thereby indicating a high light condition within the field(s) of view 104 of the corresponding imaging device(s) 102), the controller 110 may be configured to decrease the exposure time to decrease the amount of light received by the image sensor(s) of the imaging device(s) 102. However, in alternative embodiments, the controller 110 may be configured to adjust the operating parameter(s) of the imaging device(s) 102 in any other suitable manner.

Furthermore, as indicated above, the controller 110 may be configured to adjust one or more variables associated with processing the received image data based on the determined apparent color value(s) of the color indicator(s) 108. Such variables may include the range of hue values associated with a selected color and/or the like. For example, when the field of view 104 of the imaging device 102 is in indirect sunlight, the captured image data may depict any plants present within such field of view 104 as having a hue that is generally associated with the color "green." However, when the field of view 104 of the imaging device 102 is in direct sunlight or another high light condition, the captured image data may depict any plants present within the field of view 106 as having a hue that is associated with the color "turquoise" or "cyan". As such, when the apparent color value(s) is lighter than the predetermined color value(s) of the color indicator(s) 108 (thereby indicating a high light condition within the field(s) of view of the corresponding imaging device(s) 102), the controller 110 may be configured to adjust or shift the range of hues that are considered "green" to include the turquoise/cyan color. However, in alternative embodiments, the controller 110 may be configured to adjust the variable(s) associated with processing the received image data in any other suitable manner.

After adjusting the operating parameter(s) of the imaging device(s) 102 and/or the variable(s) associated with processing the received image data as described above, the controller 110 may be configured to continue receiving image data from the imaging device(s) 102. Specifically, in several embodiments, the controller 110 may be configured to determine one or more characteristics or parameters associated with the portion(s) of the field present within the field(s) of view 104 of the imaging device(s) 102, such as parameters related to soil roughness, plant health, weed growth, and/or the like, based on the newly received image data. Furthermore, the controller 110 may be configured to update the determined apparent color value(s) of the color indicator(s) 108 based on the newly received image data. Thereafter, the controller 110 may be configured to compare the updated apparent color value(s) to the predetermined apparent color value range associated with the current lighting conditions within the field(s) of view 104 of the imaging device(s) 102. When the updated apparent color value(s) falls outside of the predetermined apparent color value range (thereby indicating that the current operating parameter(s) of the imaging device(s) 102 and/or the variable(s) associated with processing the received image data are not suitable for the current lighting conditions), the controller 110 may be configured to adjust one or more operating parameter(s) of the imaging device(s) 102 and/or variable(s) associated with processing the received image data. As such, the controller 110 may be configured to adjust the same operating parameter(s)/variable(s) that were adjusted before updating the determined apparent color value(s) and/or different operating parameter(s)/variable(s).

Figure 4:
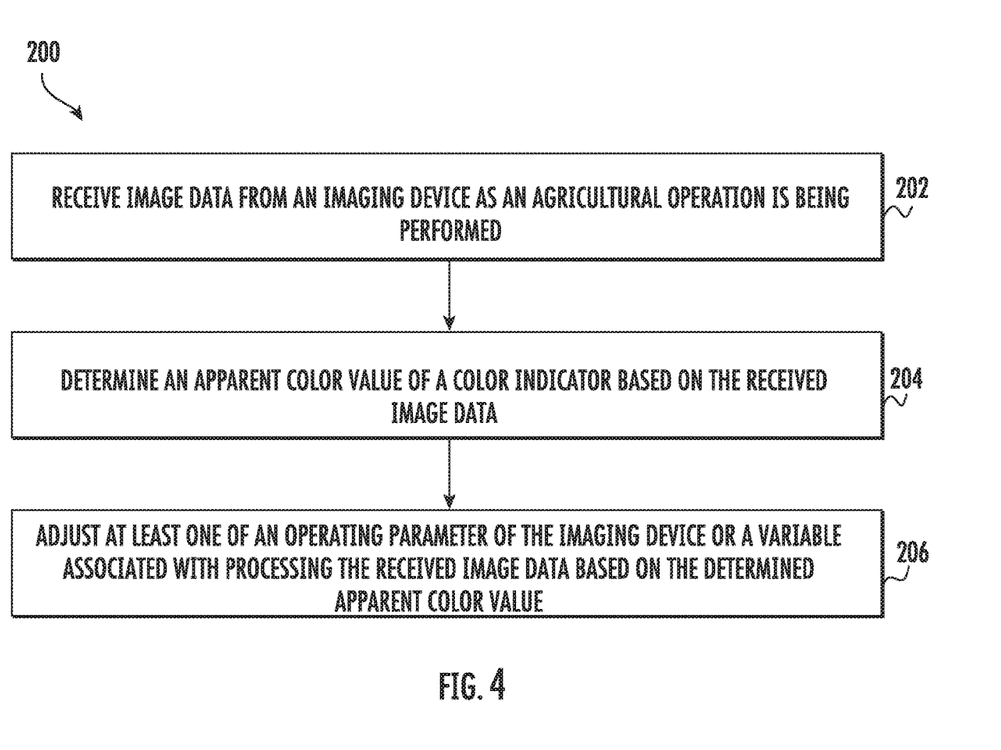
FIG. 4 illustrates a flow diagram of one embodiment of a method for calibrating image data during the performance of an agricultural operation by an agricultural machine in accordance with aspects of the present subject matter.

Referring now to FIG. 4, a flow diagram of one embodiment of a method 200 for calibrating image data during the performance of an agricultural operation by an agricultural machine is illustrated in accordance with aspects of the present subject matter. In general, the method 200 will be described herein with reference to the work vehicle 10, the agricultural implement 12, and the system 100 described above with reference to FIGS. 1-3. However, it should be appreciated by those of ordinary skill in the art that the disclosed method 200 may generally be implemented with any agricultural machine having any suitable machine configuration and/or any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving, with one or more computing devices, image data from an imaging device as an agricultural operation is being performed. For instance, as described above, the controller 110 may be configured to receive image data from an imaging device 102 coupled to and/or mounted on vehicle 10 and/or the implement 12 as the vehicle/implement 10/12 is performing an agricultural operation.

Additionally, at (204), the method 200 may include determining, with the one or more computing devices, an apparent color value of a color indicator based on the received image data. For instance, as described above, the controller 110 may be configured to determine an apparent color value of a color indicator 108 positioned within a field of view 104 of the imaging device 102 based on the received image data.

Moreover, as shown in FIG. 4, at (206), the method 200 may include adjusting, with the one or more computing devices, at least one of an operating parameter of the imaging device or a variable associated with processing the received image data based on the determined apparent color value. For instance, as described above, the controller 110 may be configured to adjust one or more operating parameters of the imaging device 102 or one or more variables associated with processing the received image data based on the determined apparent color value. The operating parameter(s) may include the exposure time, white-balance setting, brightness setting, the saturation setting, the contrast setting, and/or the activation of a flash/supplemental lighting device of the imaging device 102. Moreover, the variable(s) may include a range of hue values associated with a selected color.

It is to be understood that the steps of the method 200 are performed by the controller 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 110 described herein, such as the method 200, is implemented in software code or instructions which are tangibly stored on a tangible computer readable medium. The controller 110 loads the software code or instructions via a direct interface with the computer readable medium or via a wired and/or wireless network. Upon loading and executing such software code or instructions by the controller 110, the controller 110 may perform any of the functionality of the controller 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for calibrating image data during a performance of an agricultural operation, the system comprising:
an agricultural machine configured to perform an agricultural operation on a field across which the agricultural machine is traveling;
an imaging device provided in operative association with the agricultural machine, the imaging device configured to capture image data associated with a portion of the field within a field of view of the imaging device;
a geometric shape having a predetermined color and positioned on a portion of a frame of the agricultural machine such that the geometric shape is positioned within the field of view of the imaging device; and
a controller communicatively coupled to the imaging device, the controller configured to:
receive the image data from the imaging device;
determine an apparent color value of the geometric shape based on the received image data; and
adjust at least one of an operating parameter of the imaging device or a variable associated with processing the received image data based on the determined apparent color value.

2. The system of claim 1, wherein the controller is further configured to:
compare the determined apparent color value to a predetermined range of color values associated with the predetermined color; and
adjust the at least one of the operating parameter or the variable when the determined apparent color value falls outside of the predetermined range of color values.

3. The system of claim 2, wherein, after the operating parameter is adjusted, the controller is further configured to:
update the determined apparent color value of the geometric shape based on the received image data; and
compare the updated apparent color value to the predetermined range of color values.

4. The system of claim 3, wherein the controller is further configured to adjust the at least one of the operating parameter or the variable when the updated apparent color value falls outside of the predetermined range of color values.

5. The system of claim 3, wherein the operating parameter corresponds to a first operating parameter and the variable corresponds to a first variable, the controller being further configured to adjust at least one of a second operating parameter of the imaging device or a second variable associated with processing the received image data when the updated apparent color value falls outside of the predetermined range of color values.

6. The system of claim 1, wherein the operating parameter comprises at least one of an exposure time, a white-balance setting, a brightness setting, a saturation setting, a contrast setting, or an activation of a supplemental light of the imaging device.

7. The system of claim 1, wherein the variable comprises a range of hue values associated with a selected color.

8. The system of claim 1, wherein imaging device corresponds to a first imaging device and the geometric shape corresponds to a first geometric shape, the system further comprising:
a second imaging device provided in operative association with the agricultural machine, the second imaging device configured to capture image data associated with a second portion of the field within a field of view of the second imaging device, the second portion of the field being spaced apart from the first portion of the field; and
a second geometric shape having a predetermined color and positioned on a portion of a frame of the agricultural machine such that the second geometric shape is positioned within the field of view of the second imaging device, the controller being further configured to receive image data from the second imaging device and determine an apparent color value of the second geometric shape based on the image data received from the second imaging device.

9. The system of claim 8, wherein the controller is further configured to:
determine a color value differential between the determined first apparent color value and the determined second apparent color value; and
when it is determined that the color value differential has exceeded a predetermined differential threshold, adjust the at least one of the operating parameter or the variable.

10. The system of claim 9, wherein the predetermined differential threshold corresponds to a first predetermined differential threshold, the controller further configured to provide a notification to an operator of the agricultural machine when it is determined that the color value differential has exceeded a second predetermined differential threshold, the second predetermined differential threshold being greater than the first predetermined differential threshold.

11. A method for calibrating image data during a performance of an agricultural operation by an agricultural machine, the agricultural machine including an imaging device configured to capture image data associated with a portion of a field within a field of view of the imaging device and a geometric shape having a predetermined color and positioned on a portion of a frame of the agricultural machine such that the geometric shape is positioned within the field of view of the imaging device, the method comprising:
receiving, with one or more computing devices, image data from the imaging device as the agricultural operation is being performed;
determining, with the one or more computing devices, an apparent color value of the geometric shape based on the received image data; and
adjusting, with the one or more computing devices, at least one of an operating parameter of the imaging device or a variable associated with processing the received image data based on the determined apparent color value.

12. The method of claim 11, further comprising:
comparing, with the one or more computing devices, the determined apparent color value to a predetermined range of color values associated with the predetermined color; and
adjusting, with the one or more computing devices, the at least one of the operating parameter or the variable when the determined apparent color value falls outside of the predetermined range of color values.

13. The method of claim 12, further comprising:
after the operating parameter is adjusted, updating, with the one or more computing devices, the determined apparent color value of the geometric shape based on the received image data; and
comparing, with the one or more computing devices, the updated apparent color value to the predetermined range of color values.

14. The method of claim 13, further comprising:
adjusting, with the one or more computing devices, the at least one of the operating parameter or the variable when the updated apparent color value falls outside of the predetermined range of color values.

15. The method of claim 13, wherein the operating parameter corresponds to a first operating parameter and the variable corresponds to a first variable, the method further comprising:
adjusting, with the one or more computing devices, at least one of a second operating parameter of the imaging device or a second variable associated with processing the received image data when the updated apparent color value falls outside of the predetermined range of color values.

16. The method of claim 11, wherein the operating parameter comprises at least one of an exposure time, a white-balance setting, a brightness setting, a saturation setting, a contrast setting, or an activation of a supplemental lighting device of the imaging device.

17. The method of claim 11, wherein the operating parameter comprises a range of hue values associated with a selected color.

18. The method of claim 11, wherein imaging device corresponds to a first imaging device and the geometric shape; corresponds to a first geometric shape, the agricultural machine further including a second imaging device configured to capture image data associated with a second portion of the field within a field of view of the second imaging device, the second portion of the field being spaced apart from the first portion of the field, the agricultural machine further including a second geometric shape having a predetermined color and positioned on a portion of a frame of the agricultural machine such that the geometric shape is positioned within the field of view of the second imaging device, the method further comprising:
receiving, with the one or more computing devices, the image data from a second imaging device;
determining, with the one or more computing devices, an apparent color value of the second geometric shape based on the image data received from the second imaging device;
determining, with the one or more computing devices, a color value differential between the determined first apparent color value and the determined second apparent color value; and
when it is determined that the color value differential has exceeded a predetermined differential threshold, adjusting, with the one or more computing devices, the at least one of the operating parameter or the variable.

* * * * *